US012167212B2

(12) United States Patent
Alcock

(10) Patent No.: US 12,167,212 B2
(45) Date of Patent: Dec. 10, 2024

(54) METHOD FOR TUNING A NOISE CANCELLATION ENABLED AUDIO SYSTEM AND NOISE CANCELLATION ENABLED AUDIO SYSTEM

(71) Applicant: ams Sensors UK Limited, Cambridge (GB)

(72) Inventor: Robert Alcock, Cambridge (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 17/297,330

(22) PCT Filed: Oct. 25, 2019

(86) PCT No.: PCT/EP2019/079223
§ 371 (c)(1),
(2) Date: May 26, 2021

(87) PCT Pub. No.: WO2020/108893
PCT Pub. Date: Jun. 4, 2020

(65) Prior Publication Data
US 2022/0014850 A1 Jan. 13, 2022

(30) Foreign Application Priority Data
Nov. 29, 2018 (EP) .................................... 18209172

(51) Int. Cl.
*H04R 3/04* (2006.01)
*G10L 21/0232* (2013.01)
(Continued)

(52) U.S. Cl.
CPC ............ *H04R 3/04* (2013.01); *G10L 21/0232* (2013.01); *G10L 21/0264* (2013.01); *H04R 1/1083* (2013.01); *H04R 29/001* (2013.01)

(58) Field of Classification Search
CPC ...... H04R 3/04; H04R 1/1083; H04R 29/001; H04R 29/00; H04R 5/033; H04R 2460/01;
(Continued)

(56) References Cited

U.S. PATENT DOCUMENTS 6,393,396 B1 * 5/2002 Nakagawa .............. G10L 15/20 704/231
9,532,139 B1 12/2016 Lu et al.
(Continued)

FOREIGN PATENT DOCUMENTS

CN 101577847 A 11/2009
CN 103988525 A 8/2014
(Continued)

OTHER PUBLICATIONS

International Search Report and written opinion mailed Jan. 13, 2020 for corresponding International Application No. PCT/EP2019/079223, 12 pages.

(Continued)

*Primary Examiner* — Carolyn R Edwards
*Assistant Examiner* — Friedrich Fahnert
(74) *Attorney, Agent, or Firm* — Jefferson IP Law, LLP

(57) ABSTRACT

In a method for tuning at least one parameter of a noise cancellation enabled audio system with an ear mountable playback device comprising a speaker and a feedforward microphone the playback device is placed onto a measurement fixture, the speaker facing a test microphone located within an ear canal representation. The parameter is varied between a plurality of settings while a test sound is played. A measurement signal from the test microphone is received and stored in the audio system at least while the parameter is varied. A power minimum in the stored measurement signal and a tune parameter associated with the power (Continued)

minimum are determined in the audio system from the plurality of settings of the varied parameter.

20 Claims, 6 Drawing Sheets

(51) Int. Cl.
*G10L 21/0264* (2013.01)
*H04R 1/10* (2006.01)
*H04R 29/00* (2006.01)

(58) Field of Classification Search
CPC ............ G10L 21/0232; G10L 21/0264; G10K 2210/1081; G10K 2210/3055; G10K 2210/3057; G10K 2210/504; G10K 11/17853; G10K 11/17873; G10K 11/17813
USPC ............................................................ 381/98
See application file for complete search history.

(56) References Cited

U.S. PATENT DOCUMENTS

2004/0013273 A1 1/2004 Vaishya et al.
2006/0161280 A1 7/2006 Platzer et al.
2008/0008070 A1* 1/2008 Kwon .................... H03G 5/165 369/53.1
2008/0181422 A1 7/2008 Christoph
2009/0086988 A1 4/2009 Ou et al.
2009/0279709 A1 11/2009 Asada et al.
2010/0014685 A1 1/2010 Wurm
2010/0105447 A1 4/2010 Sibbald et al.
2012/0207317 A1 8/2012 Abdollahzadeh Milani et al.
2013/0039507 A1 2/2013 Park et al.
2013/0156213 A1 6/2013 Pan et al.
2013/0208908 A1* 8/2013 Theiler .................. G10K 11/16 381/71.1
2014/0286499 A1 9/2014 Ganeshkumar et al.
2018/0288518 A1* 10/2018 Schmidt ............... H04R 1/1008
2019/0037324 A1* 1/2019 Darlington ............. H04R 1/105
2021/0219081 A1* 7/2021 Mahalingam ........ H04R 1/1083
2022/0182032 A1 6/2022 Kim et al.

FOREIGN PATENT DOCUMENTS

CN 105051810 A 11/2015
CN 107369456 A 11/2017
CN 108702581 A 10/2018
CN 108886665 A 11/2018
EP 1681662 A2 7/2006
GB 2538432 A 11/2016
JP 2000047696 A 2/2000
KR 20080067578 A 7/2008
WO 2017129951 A1 8/2017

OTHER PUBLICATIONS

Chinese Office Action issued in corresponding Chinese Patent Application No. 2019800783106 dated Aug. 8, 2023, with English language translation attached, 12 pages.
Korean Office Action issued in corresponding Korean Patent Application No. 10-2021-7019663 dated Aug. 21, 2023, with English language translation attached, 16 pages.
Chinese Office Action issued in corresponding Chinese Patent Application No. 2019800783106 dated Nov. 14, 2023, with English language translation attached, 9 pages.
Korean Notice of Allowance issued in corresponding Korean Patent Application No. 10-2021-7019663 dated Feb. 26, 2024, with English language translation attached, 8 pages.

* cited by examiner

METHOD FOR TUNING A NOISE CANCELLATION ENABLED AUDIO SYSTEM AND NOISE CANCELLATION ENABLED AUDIO SYSTEM

CROSS-REFERENCE TO RELATED APPLICATIONS

The present application is the national stage entry of International Patent Application No. PCT/EP2019/079223, filed on Oct. 25, 2019, and published as WO 2020/108893 A1 on Jun. 4, 2020, which claims the benefit of priority of European Patent Application No. 18209172.8, filed on Nov. 29, 2018, all of which are incorporated by reference herein in their entirety.

FIELD

The present disclosure relates to a method for tuning at least one parameter of a noise cancellation enabled audio system with an ear mountable playback device, e.g. a headphone, comprising a speaker and a microphone. The present disclosure further relates to a corresponding noise cancellation enabled audio system.

BACKGROUND OF THE INVENTION

Nowadays a significant number of headphones, including earphones, are equipped with noise cancellation techniques. For example, such noise cancellation techniques are referred to as active noise cancellation or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones.

FF and FB ANC is achieved by tuning a filter based on given acoustics of a system.

Tuning is regularly performed during or at the end of production of the ANC devices, for example by measuring acoustic properties of the device. At present, tuning is performed during a calibration process with some measurement fixture like an artificial head with a microphone in the ear canal of the artificial head. The measurement, including the playing of some test sound, is coordinated from some kind of processing device which can be a personal computer or the like. To achieve an optimum ANC performance for each ANC device produced, a dedicated measurement has to be performed for each of the ANC devices under control of the processing device, which is time-consuming, especially if larger volumes of ANC devices are to be calibrated.

SUMMARY OF THE INVENTION

The present disclosure provides an improved tuning concept for noise cancellation enabled audio systems that allows to reduce tuning effort.

The improved tuning concept is based on the idea that instead of using an external processing system for coordinating the calibration procedure of a noise cancellation enabled audio system, the audio system itself takes control of the calibration process and performs tuning. Only playback of a test sound is performed externally. The improved tuning concept also allows that multiple noise cancellation enabled audio systems perform tuning in parallel or concurrently, in particular without any dependencies between the single audio systems. Only dedicated measurement fixtures with respective microphones are needed. A parameter of the audio system to be tuned may be a gain factor of a feedforward filter of a FF ANC system. However, tuning of other parameters like filter frequencies or phases can be performed as well. For example, the shape or response of the feedforward filter may be varied with the variation of the parameter.

In an embodiment of a method for tuning at least one parameter of a noise cancellation enabled audio system with an ear mountable playback device comprising a speaker and a feedforward microphone, the playback device is placed onto a measurement fixture. The playback device is placed such that the speaker faces an ear canal representation of the measurement fixture and a test microphone located within the ear canal representation. The parameter is varied between a plurality of settings while a test sound is played from an ambient sound source. A measurement signal from the test microphone is received and stored in the audio system, at least while the parameter is varied. A power minimum in the stored measurement signal is determined in the audio system. A tune parameter associated with the power minimum is determined in the audio system from the plurality of settings of the varied parameter. The latter determination, for example, is made based on the fixed time relationship between the variation of the parameter and a time instant of the power minimum in a course of power in the stored measurement signal.

For example, control of the variation of the parameter takes place from within the audio system, e.g. without being controlled from an external device.

For example, the tune parameter or a parameter derived from the tune parameter is set as the at least one parameter of the audio system. As the recording and the evaluation of the recorded signal take place within the audio system, no external processing device like a personal computer coordinating the calibration process is needed. All of the processing occurs in the audio system, so the system is autonomous. This makes it easy to calibrate large numbers of units simultaneously without large infrastructure costs.

For example, during the variation of the parameter and the recording or storing of the measurement signal, ANC is performed in the audio system, depending on the varied parameter. The at least one parameter is e.g. related to the ANC. The power of the measurement signal corresponds to the ANC performance at the user's ear, in particular at the user's eardrum. Consequently, the power minimum in the measurement signal corresponds to an optimum performance of the ANC process with respect to the varied parameter.

In various embodiments the at least one parameter is a gain factor of a feedforward filter for the noise cancellation of the audio system. This allows to keep a fixed frequency response of the FF ANC filter while adjusting or tuning only the gain of the filter to an optimum value. For example, the gain factor is subject to mechanical tolerances during production of the playback device.

For example, the at least one parameter is varied by varying the gain factor between a minimum value and a maximum value in a continuous or stepwise manner. For example, the gain factor is varied from a minimum value to the maximum value or from the maximum value to the minimum value. Such variation allows to determine the time relationship between the power minimum and the associated gain factor easily. Furthermore, it allows to see how the power of the measurement signal results around the power minimum, that is around the determined parameter associated with the power minimum more easily.

In other embodiments, varying the parameter to be tuned in a different way, like some predetermined pattern or a predetermined sequence of parameter values is still possible to determine the relationship between a power minimum and the associated parameter. For example it would be possible to find the power minimum using a binary search algorithm or an adaptive algorithm.

In various embodiments the at least one parameter determines the shape or response of a feedforward filter for the noise cancellation of the audio system. This allows flexible parametrization of the audio system.

The noise cancellation enabled audio system may comprise the ear mountable playback device, like a headphone or headset with the speaker and the microphone and further of some processing logic for playing back one or more audio signals and performing the ANC processing. To this end, the audio system may comprise a processor with memory etc., forming a signal processing portion. The signal processing portion may be included into the headphone, for example into a housing of the headphone or may be included in a separate housing like a dongle that is connected to the speaker housing via a cable. The signal processing portion may also be included in a mobile device, to which the playback device is connected by wire or wirelessly. In the latter case, the tune parameter determined during the calibration process may be stored in connection with the playback device, for example in the playback device, such that the mobile device could be exchanged without losing the calibration result.

In some embodiments the method is performed for two or more ANC enabled audio systems concurrently, for example while the same test sound is played from the ambient sound source. Hence, only one ambient sound source is necessary for tuning parameters of a plurality of ANC enabled audio systems that perform their tuning independently from each other.

In various embodiments the measurement signal is received over an audio input of the audio system. For example, during a regular mode of operation the audio input is used for receiving an audio signal to be played over the playback device. During a calibration mode of operation, where the tuning is performed, the measurement signal is received over the same audio input. The audio input can be a wired connection, for example an audio cable or audio connector, or can be a wireless connection. In both options the measurement signal from the test microphone is provided to the audio input like a regular audio signal.

In various embodiments the test sound, for example, consists of a predefined number of sinusoidal waves of different frequencies with respective predefined amplitudes. For example, the test sound is the sum of an integer number of amplitude weighted sine waves wherein the number of sine wave may be between 1 and 8, for example 3 or 4. The number and frequencies of the sine waves are, for example, selected by the manufacturer of the audio system and may be chosen to be in the frequency band where ANC operates well. It may be beneficial if the frequencies are not multiples of each other or multiples of a mains power frequency to minimize problems with harmonic distortion.

Results of the tuning can be improved if the frequencies are weighted according to user preferences. For example, the frequencies may be weighted to achieve equal loudness at the ear canal. This weighting is, for example, corresponding to a passive attenuation of the playback device or headphone.

In some implementations frequencies may be used for the test signal that are not in the ANC band. This can have the effect of minimizing an overshoot at the specified frequency. Frequencies and weighting factors may be determined in advance by user experimentation.

The amplitude of the test sound may be approximately 80 dB sound pressure level, SPL, at the ear canal.

Various options are available to determine the power minimum in the measurement signal. However, if the test sound comprises the sinusoidal waves of different frequencies as described above, determining the power minimum may comprise filtering the stored measurement signal with bandpass filters at the frequencies of the sinusoidal waves of the test sound to achieve a first intermediate signal. For example, the bandpass filters may be peak filters that reject all frequencies other than the frequencies of the sinusoidal waves. The peak filters may have a Q factor around 10, which may be chosen the same for all bandpass filters.

The first intermediate signal is then smoothed to achieve an absolute power signal. The power minimum is determined as the minimum of the absolute power signal. Smoothing may include finding absolute values of first intermediate signal. Furthermore, the signal may be smoothed with a number of top-hat filters, where the number corresponds to the number of different frequencies. The length of each of the top-hat filters may match the period of the corresponding sinusoidal wave. For example, the top-hat filters are of a non-causal type so that the signals are not time-shifted.

Determining the minimum in the absolute power signal may be a simple minimum method or may include a polynomial fit. The expected shape for a polynomial fit may be the square root of a quadratic. Furthermore, for example, it would be possible to find the minimum using a binary search algorithm or an adaptive algorithm. The position of the minimum is the time at which the best ANC occurred.

In order to determine the tune parameter, the time at which the power minimum occurred can be converted to the gain at which the power minimum occurred using linear interpolation, if the varied parameter was strapped linearly between the minimum value and the maximum value as described above.

The best ANC tends to occur at a slightly different gain value on a test fixture compared to a human. This different is called the Real Ear Calibrator Difference, RECD. The RECD is the level difference (in dB) between the optimum gain measured by calibration equipment and the optimum gain on a human. The value is usually a constant offset, measured in dB, that is specific to the design of the headphone or other playback device under test. Usually RECD is approximately 0 dB for headphones and often about 2 dB for earphones.

The value for RECD is determined experimentally by making two measurements. The first measurement is to take a golden, optimally configured headphone and ask a group of people to individually select the optimum ANC level. The second measurement is to run the calibration algorithm described above to determine the optimum tune parameter, that is the gain factor in this case. The output of the gain calibration should be equal to the average gain from the group of testers. If the result is not the same the value of RECD may be modified accordingly.

In some embodiments the method further comprises determining, in the audio system, a noise cancellation performance of the audio system based on the tune parameter and the stored measurement signal. For example, the ANC performance is determined if the determined tune parameter is set for the noise cancellation. To this end, a residual mean square, RMS, level of the overall system including ambient sound source and audio system, could be determined by muting the ANC function such that no ANC takes place, and recording the measurement signal resulting thereof. The RMS determined this way corresponds to the power of the measurement signal during muting. The muted RMS level is then compared to the RMS power level with the tune parameter set as the at least one parameter, wherein the difference, respectively ratio, corresponds to the ANC performance.

In the previous disclosure the various embodiments have been described with a single channel ANC, which may be applied in mono audio systems. However, if a stereo ANC system is used, for example with a stereo headphone, ANC is performed independently for both audio channels, i.e. left and right audio channels, independently from each other. Hence, also tuning may be performed independently.

For example, in such a configuration the playback device comprises a further speaker and a further feedforward microphone associated with the further speaker. The measurement fixture comprises a further ear canal representation and a further test microphone located within the further ear canal representation.

In such embodiments of the method, placing the playback device onto the measurement fixture comprises that the further speaker faces the further ear canal representation and the further test microphone. The method further comprises varying a further parameter of the audio system between a plurality of settings while the test sound is played. The further parameter may be an ANC-related parameter associated with the further feedforward microphone and the further speaker. A further measurement signal is received and stored, in the audio system, from the further test microphone at least while the further parameter is varied. A further power minimum in the stored further measurement signal is determined in the audio system. From the plurality of settings of the varied further parameter, a further tune parameter associated with the further power minimum is determined in the audio system. The further tune parameter or a parameter derived from the further tune parameter may be set in the audio device or the playback device.

The various implementations described above for the single channel approach also apply to the implementation with a further speaker and a further microphone in the playback device, corresponding to a dual channel approach, which should be apparent to the skilled reader.

For example, the tune parameter and the further tune parameter are both respective gain factors of the FF ANC filters of a first and a second channel. Accordingly, the optimum gains can be set for both channels. However, as in the single channel approach, tuning of other parameters like filter frequencies or phases can be performed as well. For example, the shape or response of respective feedforward filters may be varied with the variation of the parameters of the channels.

A secondary consideration with such two channels or stereo channel systems is that the ANC performance for both channels should be similar. One option for dealing with situations where this is not the case is to adjust the parameter of the higher performing channel so that its ANC performance becomes closer to that of the lower performing channel. Accordingly, still an overall improved hearing impression can be achieved.

For example, under the condition that the expected shape of the power of the measurement signal at the ear channel varies as the square root of a quadratic versus the varied parameter, e.g. gain, it should become apparent to the skilled reader to calculate a parameter of the higher performing channel where this condition is satisfied.

In a further implementation of the improved tuning concept, a noise cancellation enabled audio system with an audio processor and an ear mountable playback device comprising a speaker and a feedforward microphone is configured to be operated in a regular mode of operation and in a calibration mode of operation. The audio processor is configured, in the calibration mode of operation, for varying a parameter, which e.g. is associated with the noise cancellation at the speaker, between a plurality of settings when a test sound is played from an ambient sound source and the playback device is placed onto a measurement fixture, the speaker facing an ear canal representation of the measurement fixture and a test microphone located within the ear canal representation.

The audio processor is further configured for, in a calibration mode of operation, receiving and storing a measurement signal from the test microphone at least while the parameter is varied, determining a power minimum in the stored measurement signal, and determining from the plurality of settings of the varied parameter a tune parameter associated with the power minimum. This allows a calibration of the audio system with little external effort, in particular only the measurement fixture with the test microphone and an ambient sound source, but without the need for external coordination or processing.

In some implementations the audio processor is further configured for, in the calibration mode of operation, setting the tune parameter or a parameter derived from the tune parameter as the parameter for the regular mode of operation. The parameter may be a gain factor of a feedforward filter for the noise cancellation. However, tuning of other parameters like filter frequencies or phases can be performed as well. For example, the shape or response of the feedforward filter may be individually determined with the variation of the parameter.

In some implementations, the audio system further comprises an audio input for receiving a useful audio signal to be played over the speaker during the regular mode of operation and for receiving the measurement signal during the calibration mode of operation. Hence, both signals, the useful audio signal and the measurement signal, are received over the same audio input. The audio input can be a wired connection, for example an audio cable or audio connector, or can be a wireless connection.

In some implementations the ear mountable playback device further comprises a further speaker and a further feedforward microphone associated with the further speaker, for example for establishing a stereo system. In such a configuration the audio processor is further configured for, in the calibration mode operation, varying a further parameter, which is associated with a noise cancellation at the further speaker, between a plurality of settings while a test sound is played, the further speaker facing a further ear canal representation of the measurement fixture and a further test microphone located within the further ear canal representation. The audio processor, in the calibration mode of operation, receives and stores a further measurement signal from the further test microphone at least while the further parameter is varied, determines a further power minimum in the stored further measurement signal, and determines from the plurality of settings of the varied further parameter a further tune parameter associated with the further power minimum. Such a configuration allows tuning of a stereo audio system, for example.

Further embodiments of such an audio system become apparent to the skilled reader from the various implementations described above for the tuning method.

In all of the embodiments described above, ANC can be performed both with digital and/or analog filters. All of the audio systems may include feedback ANC as well. Processing and recording of the measurement signal(s) is preferably performed in the digital domain.

BRIEF DESCRIPTION OF THE DRAWINGS

The improved tuning concept will be described in more detail in the following with the aid of drawings. Elements having the same or similar function bear the same reference numerals throughout the drawings. Hence their description is not necessarily repeated in following drawings.

In the drawings.

DETAILED DESCRIPTION

A feed-forward noise cancellation system usually comprises of one or more microphones located on the outside of a headphone and a speaker located near the user's ear. It attenuates the ambient sound by measuring the ambient noise before it enters the ear, and processing that signal so that the acoustical signal leaving its speaker is equal and opposite to the ambient noise entering the ear, thus interfering destructively.

Figure 1:
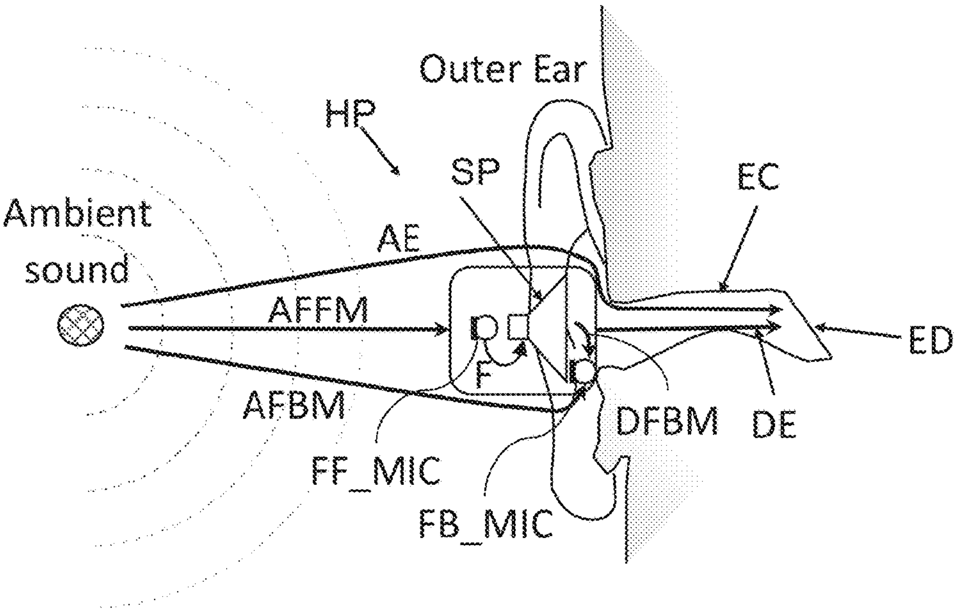
FIG. 1 shows an example headphone worn by a user with several sound paths from an ambient sound source.

FIG. 1 shows an example configuration of a headphone HP worn by a user with several sound paths. The headphone HP shown in FIG. 1 stands as an example for any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device.

The headphone HP in this example features a loudspeaker SP, a feedforward microphone FF_MIC and, optionally, a feedback microphone FB_MIC. Internal processing details of the headphone HP are not shown here for reasons of a better overview.

In the configuration shown in FIG. 1, several sound paths exist, of which each can be represented by a respective acoustic response function or acoustic transfer function. For example, a first acoustic transfer function AFFM represents the acoustic sound path between an ambient sound source and the feedforward microphone FF_MIC, and may be called an ambient-to-feedforward response function. An acoustic transfer function DE represents the acoustic sound path between the headphone's speaker SP, potentially including the response of the speaker SP itself, and a user's eardrum ED being exposed to the speaker SP, and may be called a driver-to-ear response function. A further acoustic transfer function AE represents the acoustic sound path between the ambient sound source and the eardrum ED through the user's ear canal EC, and may be called an ambient-to-ear response function.

If the feedback microphone FB_MIC is present, an acoustic transfer function DFBM represents a sound path between the speaker SP and the feedback microphone FB_MIC, and may be called a driver-to-feedback response function. The transfer function DFBM may include the response of the speaker SP itself. In such configuration, an acoustic transfer function AFBM represents the acoustic sound path between the ambient sound source and the feedback microphone FB_MIC, and may be called an ambient-to-feedback response function.

Response functions or transfer functions of the headphone HP, in particular between the microphones FF_MIC and FB_MIC and the speaker SP, can be used with a feedforward filter function and feedback filter function, respectively, which may be parameterized as noise cancellation filters during operation. The feedforward filter function is indicated in FIG. 1 with the transfer function F.

The path AE can also be called a direct path from the ambient sound source to the eardrum ED. An indirect path from the ambient sound through the noise cancellation is composed of three parts. The first part is denoted by the acoustic transfer function AFFM. The second part is denoted F which represents the transfer function through the noise cancellation accessory. It comprises e.g. the accessory's microphone response and the feedforward ANC filter, which, for a digital system, is composed of the ADC, DAC, ANC filter and any associated processing delay. The third part of the indirect path is given by the driver-to-ear response function DE.

The headphone HP as an example of the ear-mountable playback device may be embodied with both the microphones FB_MIC and FF_MIC being active or enabled such that hybrid ANC can be performed, or as a FF ANC device, where only the feedforward microphone FF_MIC is active and a feedback microphone FB_MIC is not present or at least not active.

Any specific details on processing of the microphone signals or any signal transmission are left out in FIG. 1 for reasons of a better overview. However, processing of the microphone signals in order to perform ANC may be implemented in an audio processor located within the headphone or other ear-mountable playback device or externally from the headphone in a dedicated processing unit. If the processing unit is integrated into the playback device, the playback device itself forms a noise cancellation enabled audio system. If processing is performed externally, the external device or processor together with the playback device forms the noise cancellation enabled audio system. For example, processing may be performed in a mobile device like a mobile phone or a mobile audio player, to which the headphone is connected with or without wires.

The objective of feedforward calibration is to find a parameter, e.g. the gain, of the feedforward system that causes the amplitude of the direct path AE from the ambient sound source to the ear-drum ED to be equal to the indirect path, i.e. a combination of paths AM, F and DE from the ambient sound source through the feedforward ANC to the ear-drum ED. One can find this parameter by playing a noise source from an ambient speaker, then adjusting the parameter, e.g. gain, of the feedforward ANC channel and monitoring the signal at the ear canal. One can expect to see a minimum in the signal at the ear canal when the parameter to be calibrated of the feedforward channel is ideal.

Figure 2:
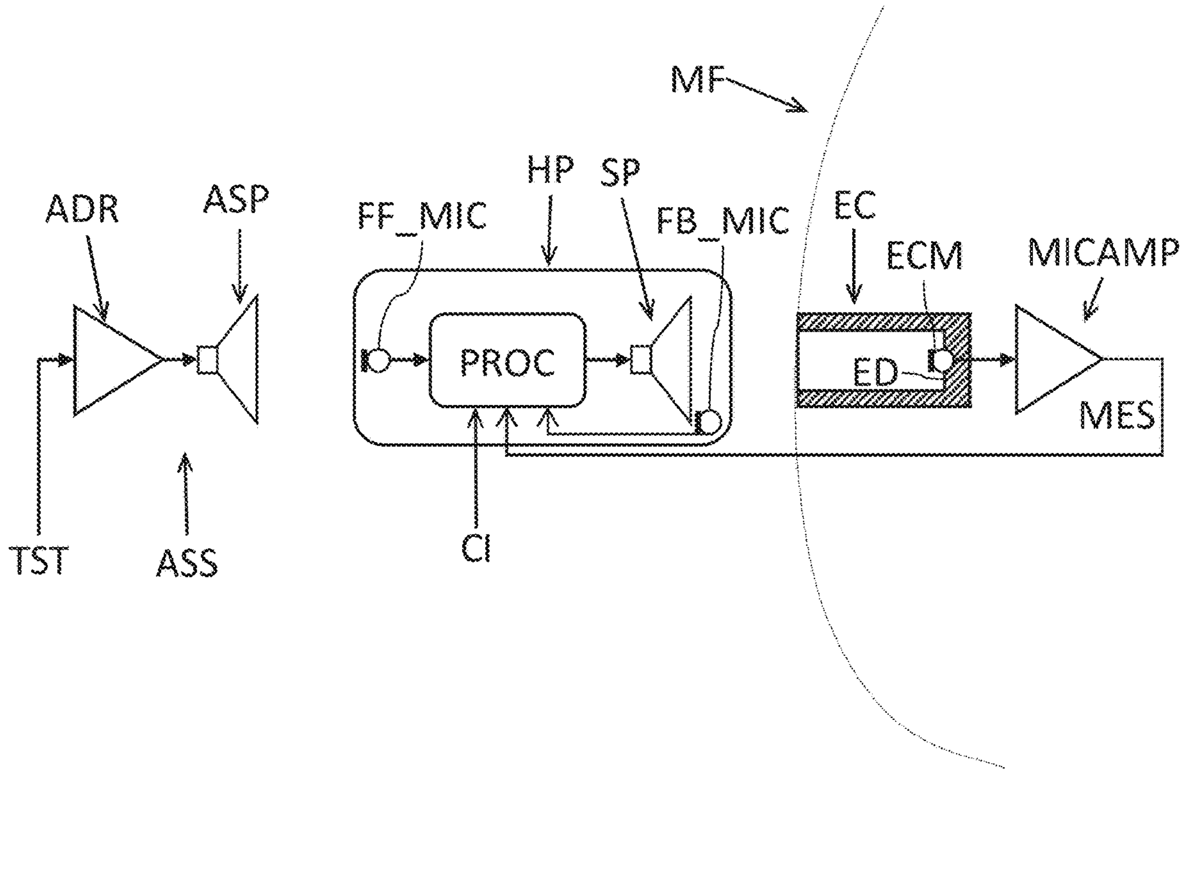
FIG. 2 shows an example implementation of a measurement configuration according to the improved tuning concept.

FIG. 2 shows an example implementation of a measurement configuration that may be used with the improved tuning concept. The measurement configuration includes an ambient sound source ASS comprising an ambient amplifier ADR and an ambient speaker ASP for playing a test sound TST. The noise cancellation enabled audio system including the headphone HP comprises the microphones FB_MIC, FF_MIC, whose signals are processed by an audio processor PROC and output via the speaker SP. The audio processor PROC may feature a control interface CI, over which processing parameters or operating modes of the audio processor PROC can be set. In some implementations, the audio processor PROC may be implemented as an ARM microprocessor, e.g. with a programmable firmware. This e.g. allows to change or adapt the respective filter algorithms and/or the calibration algorithms described below in more detail.

The headphone HP is placed onto a measurement fixture MF, which may be an artificial head with an ear canal representation EC, at the end of which a test microphone ECM is located for recording a measurement signal MES via a microphone amplifier MICAMP. The measurement signal MES is transmitted to the audio system or headphone HP via an audio input of the audio system and can be stored by the audio processor PROC for further evaluation.

It should be noted that at least a measurement fixture MF and ambient sound source ASS are represented in their basic functions, namely playing a test signal TST and recording a measurement signal MES without excluding more sophisticated implementations.

Figure 3:
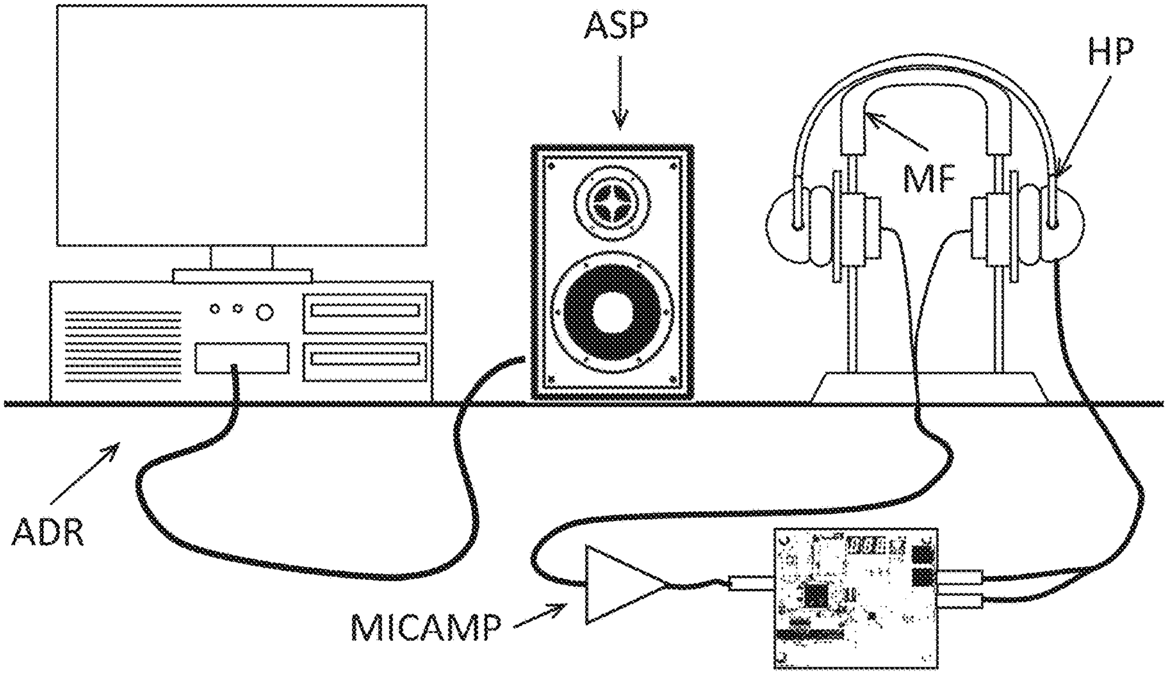
FIG. 3 shows a further example implementation of a measurement configuration according to the improved tuning concept.
Figure 3:
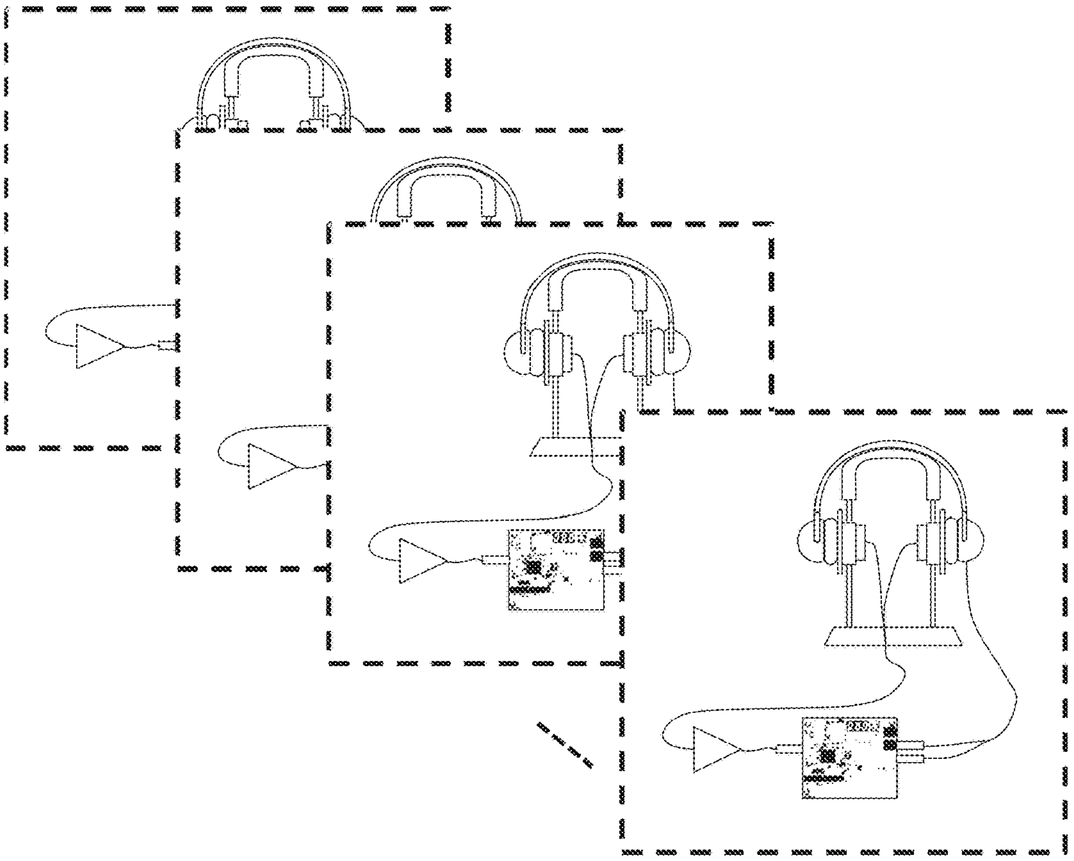

FIG. 3 shows a further example implementation of a measurement configuration according to the improved tuning concept. The configuration includes a personal computer as an example for a device providing the test signal, including the ambient amplifier ADR, and the ambient speaker ASP. The audio system is shown implemented with a circuit board including the audio processor, and a headphone HP connected to an output of the circuit board. The headphone HP is implemented as a stereo headphone with two loudspeakers and two feedforward microphones, each associated to one of the channels, respectively speakers. Accordingly, the measurement fixture MF features two ear canal representations with respective microphones (not shown) which are connected to a stereo microphone amplifier MICAMP, whose output is connected to the audio input of the audio system respectively circuit board. Although a wired connection is shown from the measurement fixture MF to the audio input, this connection could be replaced fully or partially with a wireless connection.

As can be seen both from FIG. 2 and FIG. 3, playback of the test sound via the ambient speaker ASP is completely independent from audio system and measurement fixture in terms of control, signals, etc.

Referring back to FIG. 3, a measurement setup for a single stereo audio system with ANC function is shown. Optionally, denoted with several dashed boxes with further setups of audio systems on measurement fixtures, tuning can be performed concurrently for a greater number of audio systems.

Figure 4:
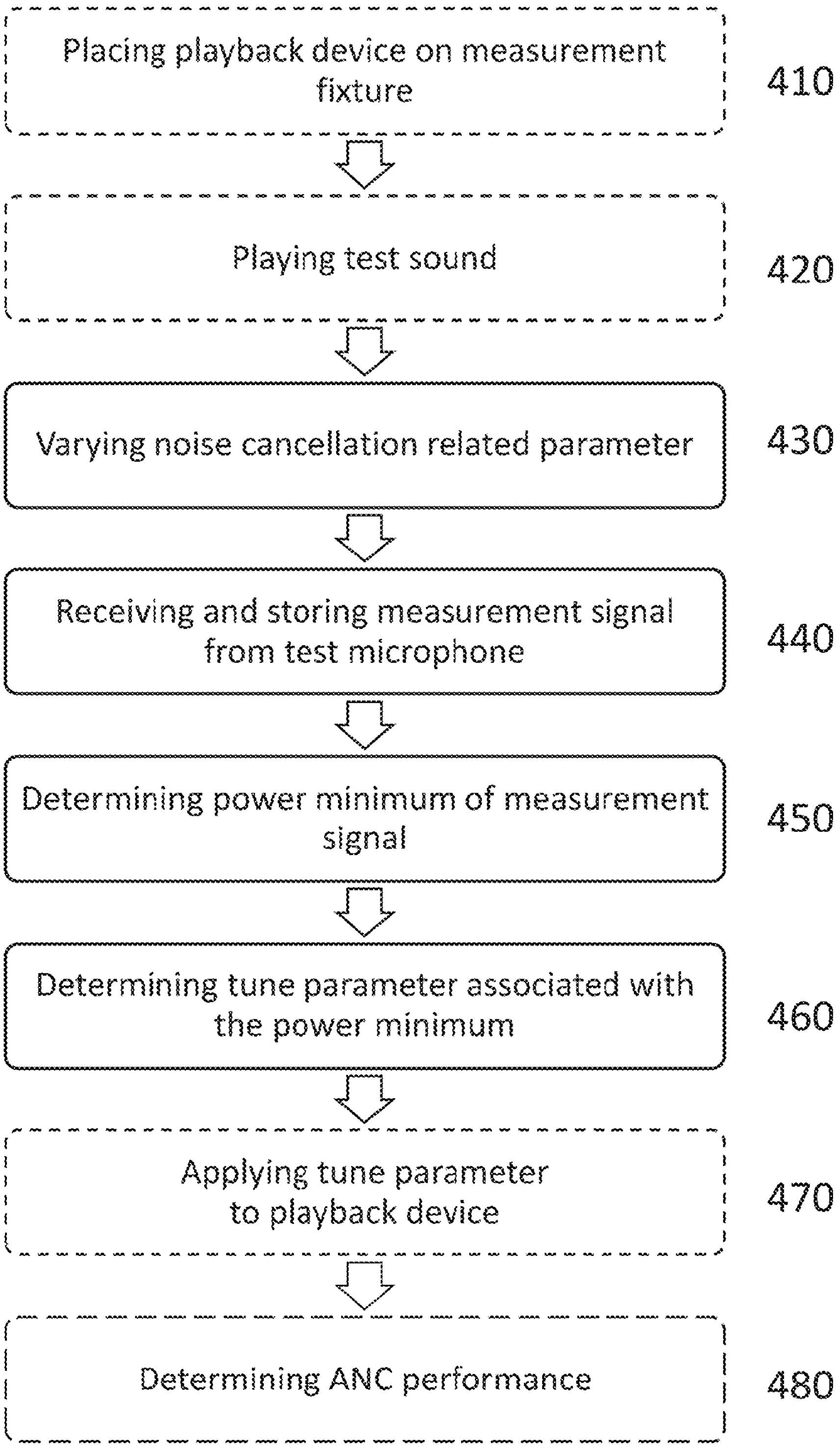
FIG. 4 shows an example implementation of a method according to the improved tuning concept.

Referring now to FIG. 4, an example block diagram showing a method flow of a method for tuning a parameter of a noise cancellation enabled audio system with an ear mountable playback device is shown. As shown in block 410, the playback device is placed on the measurement fixture, like that shown in FIG. 2 or FIG. 3, such that a speaker or the speakers face respective ear canal representations of the measurement fixture and respective test microphones located within the ear canal representations. Block 410 may include making the respective connections between the test microphones to the audio device, e.g. an audio input of the audio device.

In block 420, playing of a test sound is started or continued. For example, the test sound comprises or consists of a predefined number of sinusoidal waves of different frequencies with respective predefined amplitudes. The test sound may be a sum of a limited number of sine waves, for example one to eight sine waves, wherein three or four sine waves have been found to deliver good results. The amplitudes may be weighted to achieve equal loudness at the ear canal, respectively ear canal representation.

Figure 5:
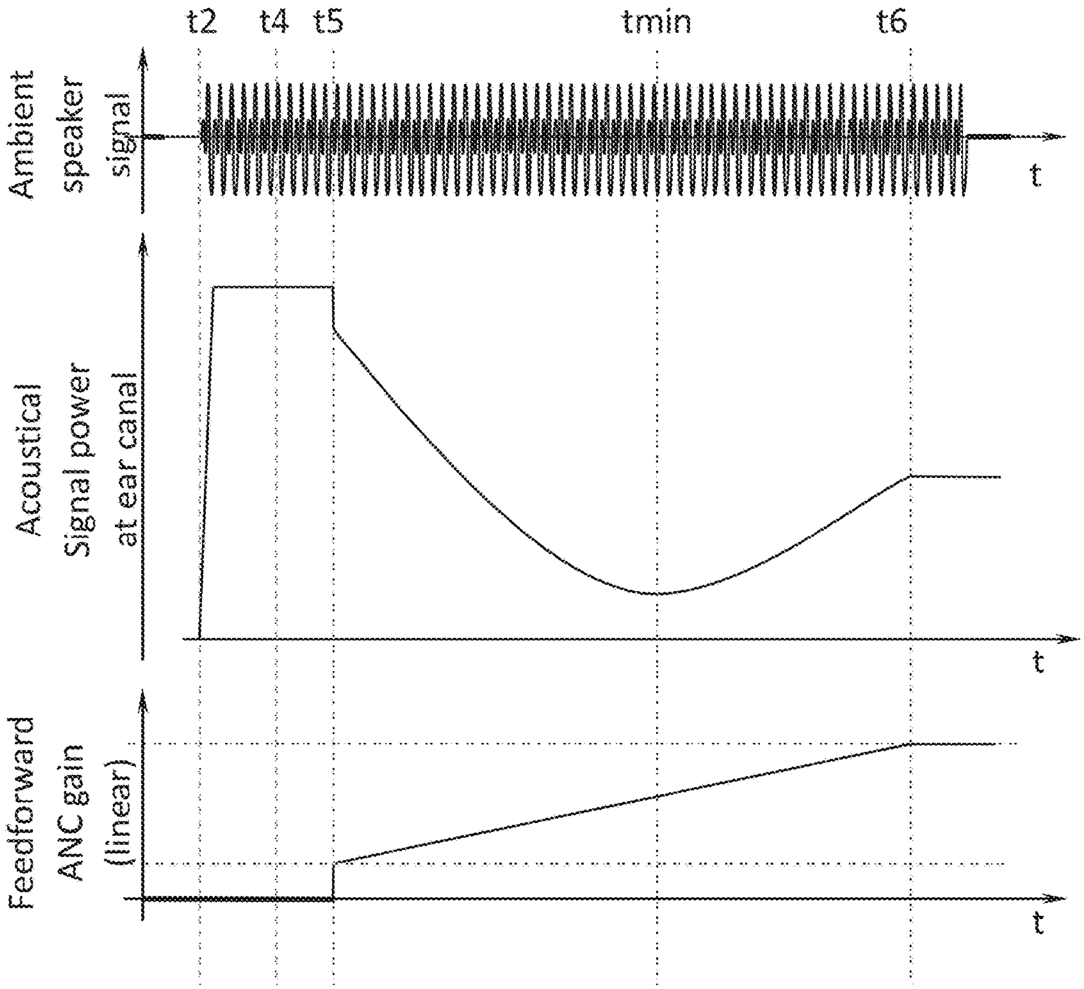
FIG. 5 shows example signals in a tuning process.

In block 430, at least one noise cancellation related parameter is started to vary while the test sound is played from the ambient sound source. Referring to FIG. 5, the top signal, labelled ambient speaker signal, represents an example of the test sound consisting of three sinusoidal waves. For example, control of the variation of the parameter takes place from within the audio system, e.g. without being controlled from an external device.

Referring again to FIG. 5, the bottom signal, labelled feedforward ANC gain, represents an example of the varied parameter, which here is the gain factor of a feedforward filter for the noise cancellation of the audio system. For example, while the gain is kept at a zero value, effectively muting the ANC function of the audio system, between time instants t2 and t5, the gain factor is linearly increased between time instants t5 and t6, remaining at the maximum value after t6. In other embodiments, varying the parameter to be tuned in a different way, like some predetermined pattern or a predetermined sequence of parameter values is still possible.

Referring now back to FIG. 4, block 440, which is performed concurrently with block 430, a measurement signal or several measurement signals are received and stored from the test microphone at least while the parameter is varied or the test sound is played. In block 450, a power minimum in the stored measurement signal is determined. Such determination may include the process of determining a power, for example a residual means square, RMS, of the measurement signal. Referring again to FIG. 5, the middle signal, labelled acoustical signal power at ear canal, represents such a power signal as an example. As can be seen from FIG. 5, the signal power has a constant, high level during muting of the ANC function, that is between time instants t2 and t5, in particular between t4 and t5, the latter interval excluding transient portions at the beginning of the measurement. In the time interval between t5 and t6, the signal power first decreases up to a minimum value at a time instant tmin and from thereon increasing up to the time instant t6 again. The time instant tmin can be determined with respective signal processing techniques, which will be explained in more detail later.

Referring back to FIG. 4, in block 460 a tune parameter is determined from the plurality of settings of the varied parameter such that the tune parameter is associated with the power minimum. Referring again to FIG. 5, the tune parameter may correspond to the setting of the feedforward ANC gain at the time instant tmin or a value derived thereof. Referring back to FIG. 4, the tune parameter may be applied to the playback device or the audio system in block 470.

Alternatively, a parameter derived from the tune parameter may be set in the playback device or audio system. As a further optional step, in block 480 an ANC performance, for example at the set parameter, may be determined. This will be explained below in more detail.

Figure 6:
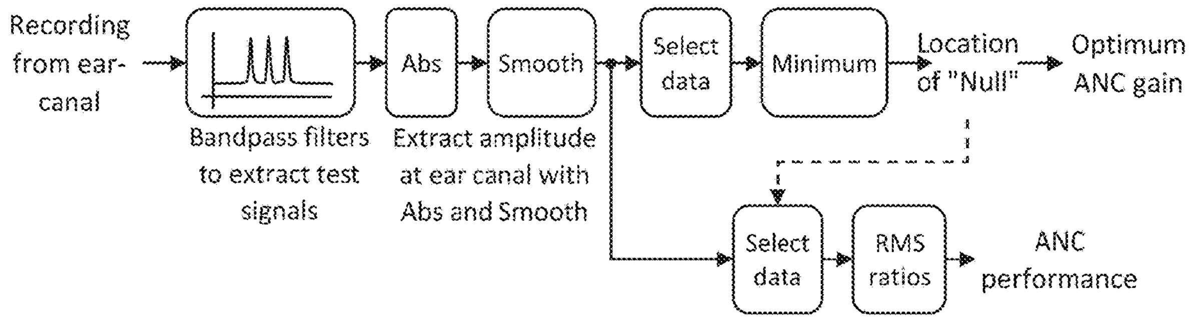
FIG. 6 shows an example flow diagram for the evaluation of a measurement signal.

Referring now to FIG. 6, a flow diagram for the processing of the stored measurement signal is shown. For example, after recording from the test microphone in the ear canal representation, bandpass filters are used to extract the frequencies of the test sound. For example, peak filters are used for this purpose that have a Q factor of approximately 10 and reject all frequencies other than the frequencies included in the test sound. In a next processing step, an absolute value of the filtered signal is formed and subsequently smoothed to extract power amplitudes at the ear canal. For example, smoothing is performed with a number of top-hat filters, the number being determined by the number of sine waves included in the test sound. The length of each of these filters may match the period of the corresponding sine wave. The output of this filtering, for example, corresponds to the middle signal in the diagram of FIG. 5.

In subsequent steps shown in the upper processing flow of FIG. 6, the respective data for evaluation are selected, in particular the data during the time interval which had a variation of the parameter or gain factor. For example, the portion(s) between time instants t5 and t6 is (are) selected from the smoothed power signal. A minimum of the power signal is determined, e.g. a position of the minimum of the smoothed signal. The algorithm to find the minimum may be a simple minimum method or may include a polynomial fit. Assuming a linearly increased parameter like in the diagram of FIG. 5, the expected shape for a polynomial fit is the square root of a quadratic. The position of the minimum is the time in which the best ANC occurred, that is with the lowest signal power.

In the lower processing flow of FIG. 6, another selection of data of the power signal is made. On the one hand, the signal power, e.g. RMS, with the ANC being muted is to be determined as a basis for an absolute ANC performance. For example, the signal is selected between time instants t4 and t5. On the other hand, based on the identified position of the minimum, the power, e.g. RMS, of the measurement signal at the optimum ANC parameter or gain is selected. A ratio between the power at the power minimum and the power with ANC turned off results in the ANC performance.

It should be noted that evaluation of the measurement signal or the power of the measurement signal, respectively, can be used to determine other properties of the audio system as well. For example, if ANC is not working correctly due to some reasons like manufacturing errors during production, the measurement signal can have a different shape, in particular between time instants t5 and t6. For example, the signal shape may have not the curved form like shown in the middle signal of FIG. 5, but may show an increasing signal power with an increasing gain factor. In such situation, the minimum of the power signal may be at the time instant t5. Accordingly, if such behavior is detected during determination of the power minimum, this may be seen as an indication of a system error and/or malfunction. In other words, a system error and/or malfunction may be detected based on the determination of the power minimum in the measurement signal.

Figure 7:
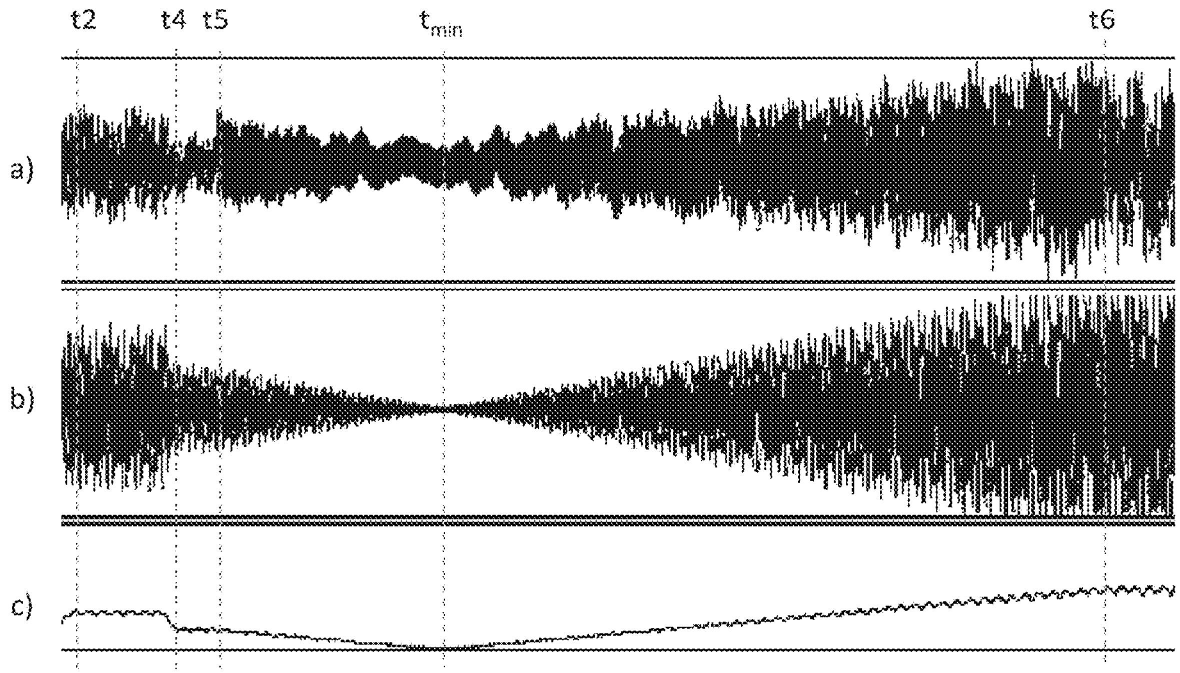
FIG. 7 shows example signals during processing of a measurement signal.

Referring now to FIG. 7, a signal diagram of the measurement signal after different processing stages is shown. For example, the top signal, labelled a), represents the unfiltered measurement signal as received from the test microphone. The middle signal, labelled b), represents the processed measurement signal after bandpass filtering as explained in conjunction with FIG. 6. The bottom signal, labelled c), represents the processed signal after absolute determination and smoothing.

Figure 8:
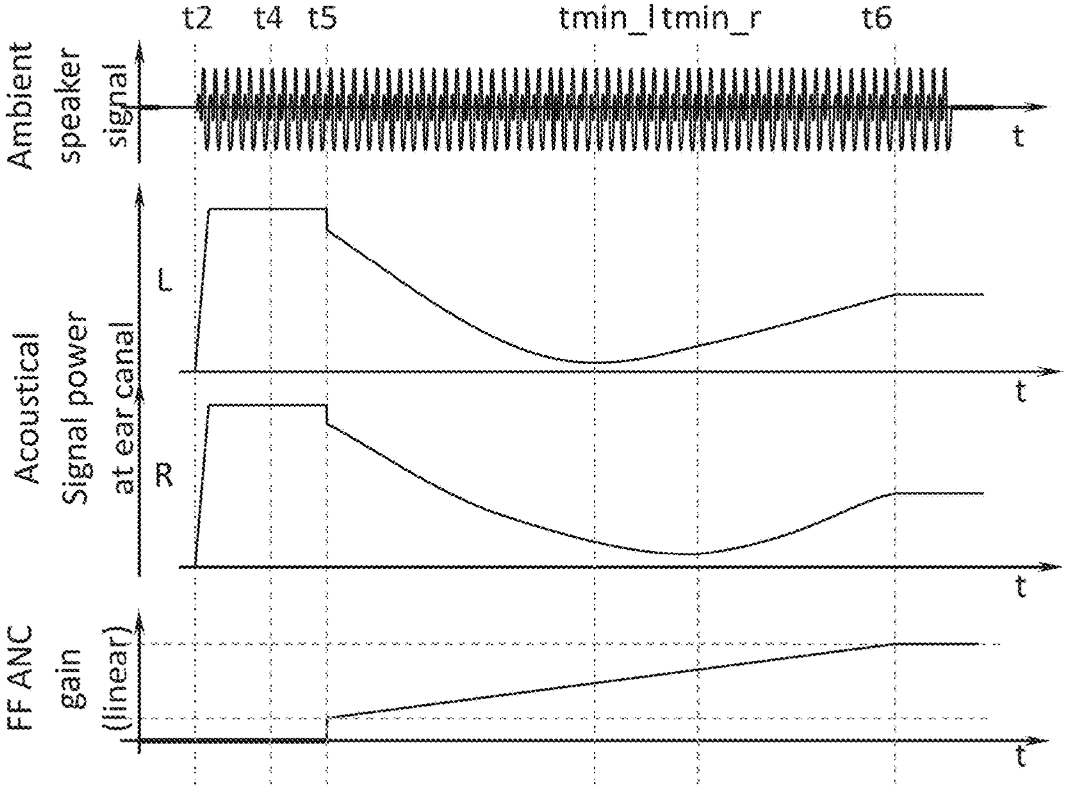
FIG. 8 shows further example signals in a tuning process.

Referring now to FIG. 8, further example signals of a tuning process are shown, being similar to that of FIG. 5 but representing the process of a stereo playback device with two independent speakers and feedforward microphones. The top and bottom signals correspond to those of FIG. 5, assuming identical gain settings for both channels. The two middle signals showing the acoustic signal power at the ear canal are divided into a left channel signal L and a right channel signal R. As can be seen from these signals, the left channel signal has a power minimum at the time instant tmin_l and the right channel power signal has its minimum at the time instant tmin_r. Hence a first gain is determined for the left channel and a second gain is determined for the right channel.

The two different gains can be set in the audio system or playback device as determined from their respective power minimums. However, in order to have comparable acoustical behavior and loudness at both channels, deviations of the determined tune parameters could also be envisaged to achieve a better user experience. Another consideration could be that the ANC performance for the left and right channels should be similar. One option for dealing with the situation where this is not the case is to adjust the gain of the higher performing channel so that its ANC performance becomes close to that of the lower performing channel. Knowing the expected shape of the measurement signal or its power signal derived thereof, the skilled person is enabled to calculate a gain where this condition is satisfied.

In various implementations described above, the variation of the parameter to be calibrated has been exemplified with tuning of a gain factor of the feedforward filter. However, it will be apparent to the skilled reader that any other parameter, in particular ANC related parameter can be calibrated as well, e.g. parameters that determine the shape or response of the feedforward filter.

Figure 9:
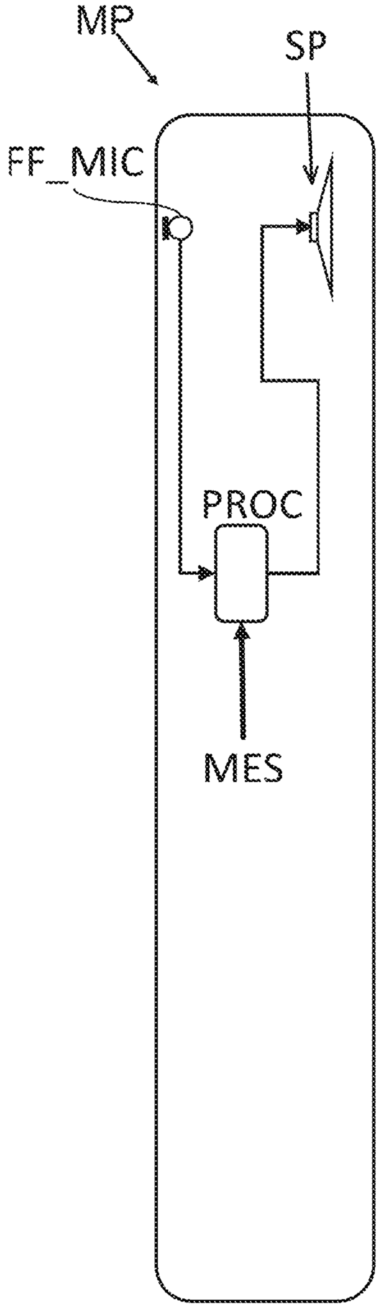
FIG. 9 shows an example implementation of a noise cancellation enabled audio system

Referring now to FIG. 9, another example of a noise cancellation enabled audio system is presented. In this example implementation, the system is formed by a mobile device like a mobile phone MP that includes the playback device with speaker SP, feedback microphone FB_MIC, feedforward microphone FF_MIC and a processor PROC for performing the ANC during operation.

In a further implementation, not shown, a headphone HP, e.g. like that shown in FIG. 1, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

The invention claimed is:

1. A method for tuning at least one parameter of an audio system, which is enabled for active noise cancellation and includes an audio processor and an ear mountable playback device comprising a speaker and a feedforward microphone, the method comprising:

placing the playback device onto a measurement fixture, wherein the speaker faces an ear canal representation of the measurement fixture and a test microphone located within the ear canal representation;

varying, in the audio processor, which is associated with the active noise cancellation at the speaker, the parameter between a plurality of settings while a test sound is played from an ambient sound source, wherein playing of the test sound via the ambient sound source is independent from the audio system and the measurement fixture at least in terms of control and signals;

receiving and storing, in the audio processor, a measurement signal from the test microphone at least while the parameter is varied;

determining, in the audio processor, a power minimum in the stored measurement signal; and determining, in the audio processor, from the plurality of settings of the varied parameter a tune parameter associated with the power minimum, wherein during a calibration mode of operation of the audio system, the measurement signal is received over an audio input of the audio system, and wherein during a regular mode of operation of the audio system, a useful audio signal to be played over the speaker is received via the audio input.

2. The method according to claim 1, further comprising:

setting the tune parameter or a parameter derived from the tune parameter as the at least one parameter.

3. The method according to claim 1, wherein the at least one parameter is a gain factor of a feedforward filter for the active noise cancellation of the audio system.

4. The method according to claim 3, wherein the at least one parameter is varied by varying the gain factor between a minimum value and a maximum value in a continuous or stepwise manner.

5. The method according to claim 1, wherein the at least one parameter determines the shape or response of a feedforward filter for the active noise cancellation of the audio system.

6. The method according to claim 1, wherein the method is performed for two or more active noise cancellation enabled audio systems concurrently, in particular while the same test sound is played from the ambient sound source.

7. The method according to claim 1, wherein the measurement signal is received over an audio input of the audio system.

8. The method according to claim 7, wherein the test sound comprises, in particular consists of, a predefined number of sinusoidal waves of different frequencies with respective predefined amplitudes and wherein determining the power minimum comprises:

filtering the stored measurement signal with bandpass filters at the frequencies of the sinusoidal waves of the test sound to achieve a first intermediate signal;

smoothing the first intermediate signal to achieve an absolute power signal; and determining a minimum of the absolute power signal.

9. The method according to claim 1, further comprising:

determining, in the audio system, an active noise cancellation performance of the audio system based on the tune parameter and the stored measurement signal.

10. The method according to claim 1, wherein the playback device comprises a further speaker and a further feedforward microphone associated with the further speaker;

the measurement fixture comprises a further ear canal representation and a further test microphone located within the further ear canal representation; and placing the playback device onto the measurement fixture comprises that the further speaker faces the further ear canal representation and the further test microphone;

the method further comprising:

varying a further parameter of the audio system between a plurality of settings while the test sound is played;

receiving and storing, in the audio system, a further measurement signal from the further test microphone at least while the further parameter is varied;

determining, in the audio system, a further power minimum in the stored further measurement signal; and determining, in the audio system, from the plurality of settings of the varied further parameter a further tune parameter associated with the further power minimum.

11. The method according to claim 1, further comprising:

setting the tune parameter or a parameter derived from the tune parameter as the at least one parameter; and performing active noise cancellation depending on the at least one parameter.

12. The method according to claim 1, wherein the test sound is played from a speaker of the ambient sound source.

13. The method according to claim 1, wherein the audio processor performs the active noise cancellation based on a signal recorded with the feedforward microphone.

14. An active noise cancellation enabled audio system with an audio processor and an ear mountable playback device comprising a speaker and a feedforward microphone, the audio system being configured to be operated in a regular mode of operation and in a calibration mode of operation, wherein the audio processor comprises an audio input and is configured for, in the calibration mode of operation, varying a parameter, which is associated with the active noise cancellation at the speaker, between a plurality of settings while a test sound is played from an ambient sound source and the playback device is placed onto a measurement fixture, the speaker facing an ear canal representation of the measurement fixture and a test microphone located within the ear canal representation, wherein playing of the test sound via the ambient sound source is independent from the audio system and the measurement fixture at least in terms of control and signals;

receiving, via the audio input, and storing a measurement signal from the test microphone at least while the parameter is varied;

determining a power minimum in the stored measurement signal; and determining from the plurality of settings of the varied parameter a tune parameter associated with the power minimum, and wherein the audio processor is configured for, in the regular mode of operation, for receiving a useful audio signal via the audio input to be played over the speaker.

15. The audio system according to claim 14, wherein the audio processor is further configured for, in the calibration mode of operation, setting the tune parameter or a parameter derived from the tune parameter as the parameter for the regular mode of operation.

16. The audio system according to claim 15, wherein the audio processor is further configured for, in the regular mode of operation, performing active noise cancellation depending on the parameter.

17. The audio system according to claim 14, wherein the parameter is a gain factor of a feedforward filter for the active noise cancellation or determines the shape or response of the feedforward filter.

18. The audio system according to claim 14, the ear mountable playback device further comprising a further speaker and a further feedforward microphone associated with the further speaker, wherein the audio processor is further configured for, in the calibration mode of operation, varying a further parameter, which is associated with an active noise cancellation at the further speaker, between a plurality of settings while the test sound is played, the further speaker facing a further ear canal representation of the measurement fixture and a further test microphone located within the further ear canal representation;

receiving and storing a further measurement signal from the further test microphone at least while the further parameter is varied;

determining a further power minimum in the stored further measurement signal; and determining from the plurality of settings of the varied further parameter a further tune parameter associated with the further power minimum.

19. The audio system according to claim 14, wherein the test sound is played from a speaker of the ambient sound source.

20. The audio system according to claim 14, wherein the audio processor performs the active noise cancellation based on a signal recorded with the feedforward microphone.

* * * * *